United States Patent
Hart et al.

(10) Patent No.: US 11,548,481 B2
(45) Date of Patent: Jan. 10, 2023

(54) SENSOR CLEANING SYSTEM

(71) Applicant: GM GLOBAL TECHNOLOGY OPERATIONS LLC, Detroit, MI (US)

(72) Inventors: Nathaniel W. Hart, Beverly Hills, MI (US); Adam L. Wright, Livonia, MI (US); Michelle M. Clem, Saint Clair, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 207 days.

(21) Appl. No.: 16/741,244

(22) Filed: Jan. 13, 2020

(65) Prior Publication Data
US 2021/0213913 A1 Jul. 15, 2021

(51) Int. Cl.
| | | |
|---|---|---|
| *B60S 1/54* | (2006.01) | |
| *B60R 11/00* | (2006.01) | |
| *B08B 7/02* | (2006.01) | |
| *B08B 5/02* | (2006.01) | |

(52) U.S. Cl.
CPC ............... *B60S 1/544* (2013.01); *B08B 5/02* (2013.01); *B08B 7/028* (2013.01); *B60R 11/00* (2013.01)

(58) Field of Classification Search
None
See application file for complete search history.

(56) References Cited

U.S. PATENT DOCUMENTS

| | | | |
|---|---|---|---|
| 2018/0086316 A1* | 3/2018 | Trebouet | B08B 3/08 |
| 2018/0265048 A1* | 9/2018 | Schmidt | B08B 5/02 |

FOREIGN PATENT DOCUMENTS

| | | | |
|---|---|---|---|
| CN | 105128825 A | | 12/2015 |
| CN | 105480208 A | * | 4/2016 |
| CN | 105905075 A | | 8/2016 |
| CN | 108067450 A | | 5/2018 |
| CN | 109501732 A | | 3/2019 |
| JP | 2018034646 A | | 3/2018 |

OTHER PUBLICATIONS

CN 105480208 English abstract (Year: 2022).*

* cited by examiner

*Primary Examiner* — Eric W Golightly
(74) *Attorney, Agent, or Firm* — Quinn IP Law

(57) ABSTRACT

A sensor lens cleaning system for a cylindrical sensor having a sensor lens surface includes an extended member having a first end coupled to the cylindrical sensor and a second end opposite the first end, a nozzle coupled to the second end of the extended member, an actuator coupled to the extended member and configured to control the extended member, and a controller in electronic communication with the actuator and configured to communicate an actuator control signal to the actuator. The nozzle generates an air stream directed at the sensor lens surface.

20 Claims, 2 Drawing Sheets

SENSOR CLEANING SYSTEM

INTRODUCTION

The present disclosure relates generally to systems for sensor cleaning including a contactless wiper blade.

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Autonomous vehicles are equipped with a variety of sensors to provide information on the surrounding environment. Sensors commonly found on autonomous vehicles include LIDAR sensors, RADAR, and optical cameras. During operation, debris can become lodged on or stuck to the lens of the sensor. The debris can compromise the field of view of the sensor and thus compromise performance of the autonomous driving system.

SUMMARY

Embodiments according to the present disclosure provide a number of advantages. For example, embodiments according to the present disclosure enable contactless cleaning of a sensor lens surface to prevent damage to the lens surface caused by contact between debris and a wiper blade.

In one aspect of the present disclosure, a sensor lens cleaning system for a cylindrical sensor having a sensor lens surface includes an extended member having a first end coupled to the cylindrical sensor and a second end opposite the first end, a nozzle coupled to the second end of the extended member, an actuator coupled to the extended member and configured to control the extended member, and a controller in electronic communication with the actuator and configured to communicate an actuator control signal to the actuator. The nozzle generates an air stream directed at the sensor lens surface.

In some aspects, the extended member is rotatably coupled at the first end to the cylindrical sensor at a pivot point such that the nozzle moves in an arc about the pivot point.

In some aspects, the actuator control signal controls the actuator to rotate the extended member in an arc.

In some aspects, the nozzle extends parallel to the sensor lens surface.

In some aspects, the nozzle extends along at least a portion of the sensor lens surface.

In some aspects, the nozzle is coupled to the second end of the extended member at approximately a 90-degree angle.

In some aspects, the extended member is rotatably coupled to the cylindrical sensor and the nozzle rotates in an arc adjacent to and not in contact with the sensor lens surface as the extended member rotates about the first end.

In some aspects, the extended member is rotatably coupled to the cylindrical sensor, the nozzle includes a linear array of micro fans, and the micro fans rotate in an arc adjacent to and not in contact with the sensor lens surface as the extended member rotates about the first end.

In some aspects, the extended member is rotatably coupled to the cylindrical sensor, the nozzle includes an array of resonant actuators configured to generate ultrasonic pulses to simulate air surrounding the sensor lens surface, and the resonant actuators rotate in an arc adjacent to and not in contact with the sensor lens surface as the extended member rotates about the first end.

In some aspects, the extended member is rotatably coupled to the cylindrical sensor, the nozzle includes a contactless airfoil blade, and the blade rotates in an arc adjacent to and not in contact with the sensor lens surface as the extended member rotates about the first end.

In another aspect of the present disclosure, a sensor assembly for a vehicle includes a vehicle sensor having a cylindrical sensor body including a top surface, a bottom surface laterally spaced from the top surface, and a sensor lens surface perpendicular to the top and bottom surfaces, an extended member having a first end coupled to the cylindrical sensor body and a second end opposite the first end, and a nozzle coupled to the second end of the extended member. The nozzle generates an air stream directed at the sensor lens surface.

In some aspects, the extended member is rotatably coupled to the top surface of the cylindrical sensor body at the first end such that the nozzle moves in an arc around the sensor lens surface without contacting the sensor lens surface.

In some aspects, the extended member is rotatably coupled to the bottom surface of the cylindrical sensor body at the first end such that the nozzle moves in an arc around the sensor lens surface without contacting the sensor lens surface.

In some aspects, the sensor assembly further includes an actuator coupled to the extended member and a controller in electronic communication with the actuator, and wherein the controller generates an actuator control signal to control the actuator to rotate the extended member in an arc.

In some aspects, the vehicle sensor is a 360-degree LIDAR sensor and the sensor lens surface fully encircles the cylindrical sensor body.

In some aspects, the vehicle sensor is a 180-degree LIDAR sensor and the sensor lens surface encircles approximately half of the cylindrical sensor body.

In some aspects, the nozzle extends parallel to and along at least a portion of the sensor lens surface.

In another aspect of the present disclosure, an automotive vehicle includes a vehicle body, a cylindrical vehicle sensor coupled to the vehicle body, the cylindrical vehicle sensor having a top surface, a bottom surface opposite the top surface, and a sensor lens surface perpendicular to both of the top and bottom surfaces, the sensor lens surface extending around a periphery of the cylindrical vehicle sensor, and a sensor lens cleaning system coupled to the cylindrical vehicle sensor, the sensor lens cleaning system configured to remove debris from at least a portion of the sensor lens surface of the cylindrical vehicle sensor. The sensor lens cleaning system includes an extended member having a first end rotatably coupled to the cylindrical vehicle sensor and a second end opposite the first end, a nozzle coupled to the second end of the extended member, an actuator configured to control the extended member, and a controller in electronic communication with the actuator and configured to communicate an actuator control signal to the actuator. The nozzle generates an air stream directed at the sensor lens surface.

In some aspects, the cylindrical vehicle sensor is a 360-degree LIDAR sensor and the extended member is rotatably coupled to the top surface of the cylindrical sensor body at the first end such that the nozzle moves in an arc around the sensor lens surface without contacting the sensor lens surface.

In some aspects, the cylindrical vehicle sensor is a 360-degree LIDAR sensor and the extended member is rotatably coupled to the bottom surface of the cylindrical sensor body at the first end such that the nozzle moves in an arc around the sensor lens surface without contacting the sensor lens surface.

BRIEF DESCRIPTION OF THE DRAWINGS

The present disclosure will be described in conjunction with the following figures, wherein like numerals denote like elements.

Figure 1:
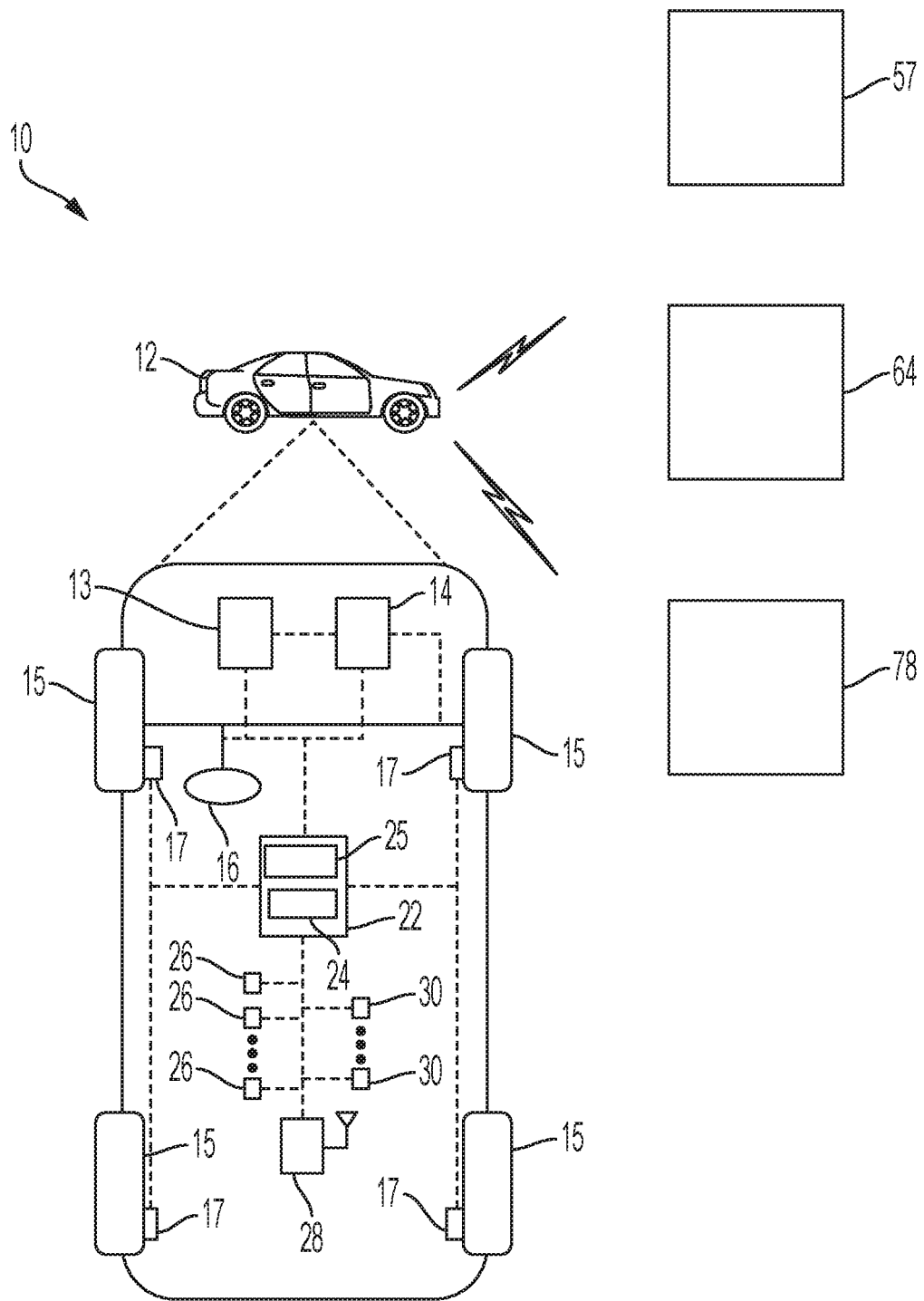
FIG. 1 is a schematic diagram of a communication system including a sensor-equipped vehicle, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import. Throughout the disclosure, like reference numbers refer to like components.

FIG. 1 schematically illustrates an operating environment that comprises a mobile vehicle communication and control system 10 for a motor vehicle 12. The communication and control system 10 for the vehicle 12 generally includes a networked wireless device 57 including but not limited to a smart phone, tablet, or wearable device such as a watch, a computer 64, and a remote access center 78.

As discussed herein, the vehicle 12 includes a variety of sensors 26 that provide information to assist with control of the vehicle 12. The sensors 26 include, in some embodiments, one or more GPS, RADAR, LIDAR, optical cameras, thermal cameras, ultrasonic sensors, and/or additional sensors as appropriate. The field of view or vision of a LIDAR, RADAR, optical camera, or other sensor may be compromised in inclement weather driving conditions by condensation, precipitation, or debris on the lens of the sensor. The field of vision of the sensor may also be compromised due to damage to the lens of the sensor. Sensor cleaning methods and systems discussed herein are used to mitigate issues related to compromised fields of view by cleaning and analyzing the sensors' fields of view. In some embodiments, a cleaning system includes an articulating sensor-protecting lens, an integrated and replaceable wiper, and a control system configured to detect and categorize permanent or temporary irregularities in the lens surface, allowing the system to rotate the lens to avoid any permanently damaged area and determine if lens replacement is needed.

The vehicle 12, shown schematically in FIG. 1, includes a propulsion system 13, which may in various embodiments include an internal combustion engine, an electric machine such as a traction motor, and/or a fuel cell propulsion system. Vehicle 12 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel for illustrative purposes, in some embodiments contemplated within the scope of the present disclosure, the steering system 16 may not include a steering wheel.

The vehicle 12 includes a wireless communication system 28 configured to wirelessly communicate with other vehicles ("V2V") and/or infrastructure ("V2I"). In an exemplary embodiment, the wireless communication system 28 is configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor such as a central processing unit (CPU) or graphics processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

The controller 22 also includes a sensor evaluation and cleaning control system 25 for automatically detecting and analyzing irregularities in the lens of the sensor 26. In an exemplary embodiment, the control system 25 is configured to determine whether an irregularity on an articulating sensor lens is permanent or temporary and move or rotate the sensor lens to improve the field of view of the sensor 26 via one or more actuators 30 in response to input received from one or more of the sensors 26. As discussed herein, the sensors 26 include RADAR, LIDAR, optical cameras, and/or additional sensors for which a clear field of view improves the function of the sensor.

FIG. 1 illustrates several networked devices that can communicate with the wireless communication system 28 of the vehicle 12. One of the networked devices that can communicate with the vehicle 12 via the wireless communication system 28 is the networked wireless device 57. The networked wireless device 57 can include computer processing capability, a transceiver capable of communicating using a short-range wireless protocol, and a visual display. The computer processing capability includes a microprocessor in the form of a programmable device that includes one or more instructions stored in an internal memory structure and applied to receive binary input to create binary output. In some embodiments, the networked wireless device 57 includes a GPS module capable of receiving GPS satellite signals and generating GPS coordinates based on those signals. In other embodiments, the networked wireless device 57 includes cellular communications functionality such that the networked wireless device 57 carries out voice and/or data communications over a wireless carrier system using one or more cellular communications protocols.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the networked wireless device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12.

The remote access center 78 is designed to provide the wireless communication system 28 of the vehicle 12 with a number of different system functions and generally includes one or more databases, live advisors, as well as an automated voice response system (VRS). These various remote access center components are preferably coupled to one another via a wired or wireless local area network. The databases can store account information such as subscriber authentication information, vehicle identifiers, profile records, behavioral patterns, sensor status data, and other pertinent subscriber information. Data transmissions may also be conducted by wireless systems, such as 802.11x, GPRS, and the like. The remote access center 78 can utilize the VRS as an automated advisor, or a combination of the VRS and the live advisor can be used.

It should be understood that the disclosed methods can be used with any number of different systems and is not specifically limited to the operating environment shown here. The architecture, construction, setup, and operation of the system 10 and its individual components is generally known. Other systems not shown here and known to those skilled in the art could employ the disclosed methods as well.

Figure 2:
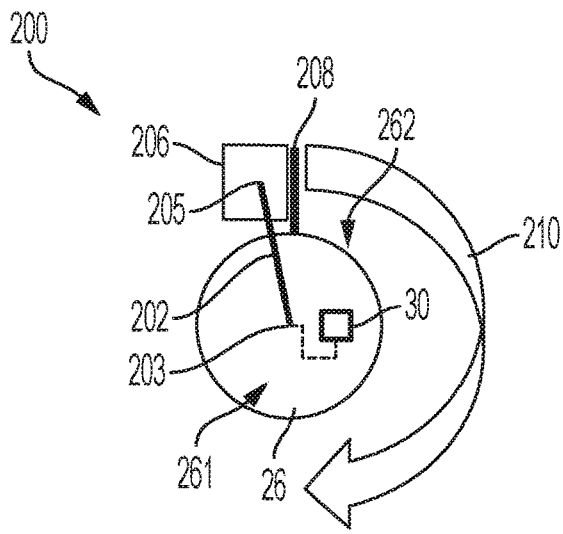
FIG. 2 is a schematic top view diagram of a contactless cleaning system for a sensor, according to an embodiment.
Figure 3:
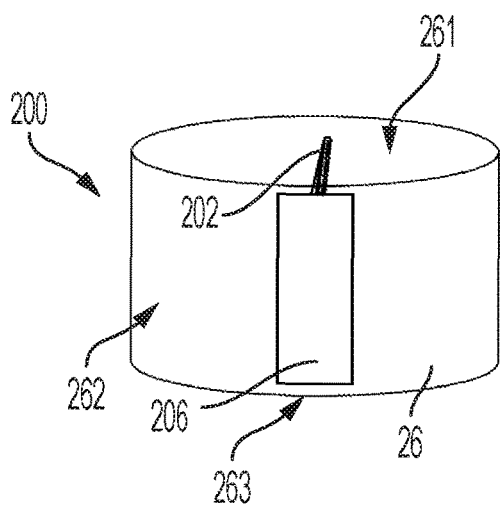
FIG. 3 is a schematic side view diagram of the contactless cleaning system shown in FIG. 2, according to an embodiment.

FIGS. 2 and 3 illustrate a contactless cleaning system 200 for a sensor, such as one of the sensors 26, according to an embodiment. In the illustrated embodiment, the sensor 26 is a 360-degree cylindrical LIDAR sensor having a viewable lens surface 262 that extends 360-degrees around the perimeter of the sensor 26 and extends laterally across at least a portion of the side of the sensor 26 from a top surface to a bottom surface of the sensor 26. The sensors 26, along with the controller 22 and the ADS 24, capture and identify features of the surrounding environment including objects, road edge and vehicles, for example and without limitation. Over time, at least a portion of the field of view of the sensor 26 may become impaired due to debris or other impairment that impairs at least a portion of a field of view of one or more of the sensors 26 include precipitation or debris, which can include contaminants such as, for example and without limitation, rain, dust, road debris, road spray, snow, ice, insects, salt spray, etc. Additionally, fogging or condensation may also impair all or a portion of the lens of the sensor 26. Many of these impairments are temporary and may be cleaned or removed. However, wiping a polycarbonate lens or fascia of the sensor 26 with a traditional, contact wiper blade may scratch or otherwise damage the lens surface, further impairing the field of view of the sensor and permanently damaging the lens.

The cleaning system 200 shown in FIGS. 2 and 3 for the sensor 26 includes an extended member 202. The extended member or arm 202 has a first end 203 rotatably coupled to a top surface 261 of the sensor 26 and a second end 205 opposite the first end 203. The cleaning system 200 also includes a nozzle 206. The nozzle 206 is coupled to the second end 205 of the extended member 202. The nozzle 206 extends at approximately a 90-degree angle from the extended member 202 such that the nozzle 206 extends along the side of the sensor 26, substantially parallel to the lens surface 262. In various embodiments, the cleaning system 200 also includes an actuator 30 coupled to the extended member 202. The actuator 30 is in electronic communication with the controller 22 (as shown in FIG. 1). The controller 22 generates a control signal to control a rotational movement of the extended member 202, as discussed in greater detail herein. While the extended member 202 is shown coupled to the top surface 261 of the sensor 26, in various embodiments, the extended member 202 is coupled to a bottom, or underside surface 263 of the sensor 26 opposite the top surface 261. The bottom surface 263 is laterally spaced from the top surface 261 and the lens surface 262 is positioned between the top and bottom surfaces 261, 263.

In various embodiments, the extended member 202 is rotatably coupled at the first end 203 to the sensor 26 at a pivot point. In response to the actuator control signal received from the controller 22, the extended member 202 rotates relative to the sensor 26. Rotation of the extended member 202 causes rotation of the nozzle 206 around the lens surface 262 of the sensor 26, as illustrated by the arc 210. In various embodiments, the nozzle 206 extends laterally between the top and bottom surfaces 261, 263 and does not contact the lens surface 262 during rotation. In various embodiments, the nozzle 206 is coupled to an air source, such as, for example and without limitation, a compressor (not shown), and, directs an air stream 208 toward the lens surface 262. The air stream 208 removes debris and other contaminants from the lens surface 262 without contacting the lens surface 262. The cleaning system 200 rotates about the sensor 26 such that the 360-degree lens surface 262 is exposed to the air stream 208 produced by the nozzle 206.

In various embodiments, the nozzle 206 is a contactless blade having an airfoil shape that rotates around the cylindrical sensor 26 due to rotation of the extended member 202. As the airfoil shaped blade rotates about the cylindrical sensor 26, the air stream created by the motion of the blade blows or removes debris, liquid, or other contaminants off of the lens surface 262.

In various embodiments, the nozzle 206 includes a linear array of micro fans that rotates around the cylindrical sensor 26 due to rotation of the extended member 202. As the micro fan array rotates about the cylindrical sensor 26, the fans blow or remove debris, liquid, or other contaminants off of the lens surface 262.

In various embodiments, the nozzle 206 includes an array of resonant actuators to generate ultrasonic pulses to stimulate the environmental air in the vicinity of the lens surface. The array of resonant actuators rotates around the cylindrical sensor 26. As the actuator array rotates about the cylindrical sensor 26, the ultrasonic pulses blow or remove debris, liquid, or other contaminants off of the lens surface 262.

Figure 4:
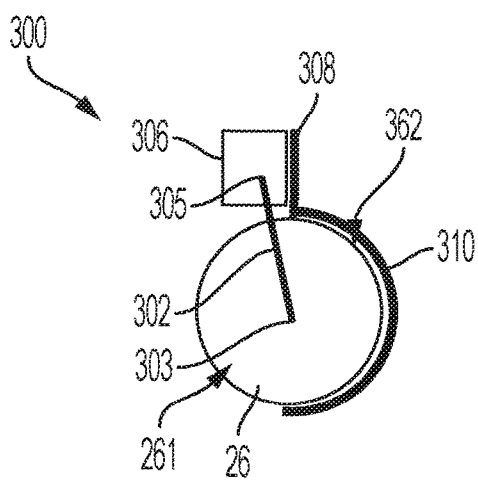
FIG. 4 is a schematic top view diagram of a contactless cleaning system for a sensor, according to another embodiment.

Another embodiment of a cleaning system 300 is illustrated in FIG. 4. The cleaning system 300 is configured for use with a 180-degree cylindrical LIDAR sensor 26, that is, the sensor 26 has a 180-degree viewable lens surface 362. The cleaning system 300 includes an extended member 302. The extended member or arm 302 has a first end 303 fixedly coupled to the top surface 261 of the sensor 26 and a second end 305 opposite the first end 303. The cleaning system 300 also includes a nozzle 306. The nozzle 306 is coupled to the second end 305 of the extended member 302. While the extended member 302 is shown coupled to the top surface 261 of the sensor 26, in various embodiments, the extended member 302 is coupled to a bottom, or underside surface of the sensor 26 opposite the top surface 261.

In various embodiments, the extended member 302 is fixed in one position relative to the sensor 26. The nozzle 306 directs an air stream 308 towards the lens surface 362 that forms a jet flow 310 that attaches to the lens surface 362. The attached jet flow 310 clears debris and other contaminants from the lens surface 362 using the Coanda effect. The Coanda effect is a known phenomenon in which a jet flow attaches itself to a nearby surface and remains attached even when the surface curves away from the initial jet direction. The cleaning system 300 includes no moving components, reducing the manufacturing complexity and improving system robustness.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A sensor lens cleaning system comprising:
   a cylindrical sensor couplable to a vehicle body, the cylindrical sensor having a top surface, a bottom surface opposite the top surface, and a sensor lens surface perpendicular to both of the top and bottom surfaces, the sensor lens surface extending around a periphery of the cylindrical sensor;
   an extended member having a first end coupled to the cylindrical sensor and a second end opposite the first end;
   a nozzle coupled to the second end of the extended member;
   an actuator coupled to the extended member and configured to control the extended member; and
   a controller in electronic communication with the actuator and configured to communicate an actuator control signal to the actuator;
   wherein the nozzle generates an air stream directed at the sensor lens surface to remove debris from at least a portion of the sensor lens surface of the cylindrical sensor.

2. The sensor lens cleaning system of claim 1, wherein the extended member is rotatably coupled at the first end to the cylindrical sensor at a pivot point such that the nozzle moves in an arc about the pivot point.

3. The sensor lens cleaning system of claim 1, wherein the actuator control signal controls the actuator to rotate the extended member in an arc.

4. The sensor lens cleaning system of claim 1, wherein the nozzle extends parallel to the sensor lens surface.

5. The sensor lens cleaning system of claim 4, wherein the nozzle extends along at least a portion of the sensor lens surface.

6. The sensor lens cleaning system of claim 1, wherein the nozzle is coupled to the second end of the extended member at approximately a 90-degree angle.

7. The sensor lens cleaning system of claim 1, wherein the extended member is rotatably coupled to the cylindrical sensor and the nozzle rotates in an arc adjacent to and not in contact with the sensor lens surface as the extended member rotates about the first end.

8. The sensor lens cleaning system of claim 1, wherein the extended member is rotatably coupled to the cylindrical sensor, the nozzle includes a linear array of micro fans, and the micro fans rotate in an arc adjacent to and not in contact with the sensor lens surface as the extended member rotates about the first end.

9. The sensor lens cleaning system of claim 1, wherein the extended member is rotatably coupled to the cylindrical sensor, the nozzle includes an array of resonant actuators configured to generate ultrasonic pulses to simulate air surrounding the sensor lens surface, and the resonant actuators rotate in an arc adjacent to and not in contact with the sensor lens surface as the extended member rotates about the first end.

10. The sensor lens cleaning system of claim 1, wherein the extended member is rotatably coupled to the cylindrical sensor, the nozzle includes a contactless airfoil blade, and the blade rotates in an arc adjacent to and not in contact with the sensor lens surface as the extended member rotates about the first end.

11. A sensor assembly for a vehicle, comprising:
a vehicle sensor having a cylindrical sensor body including a top surface, a bottom surface laterally spaced from the top surface, and a sensor lens surface perpendicular to the top and bottom surfaces, the sensor lens surface extending around a periphery of the vehicle sensor;
an extended member having a first end coupled to the cylindrical sensor body and a second end opposite the first end;
a nozzle coupled to the second end of the extended member;
an actuator configured to control the extended member; and
a controller in electronic communication with the actuator and configured to communicate an actuator control signal to the actuator;
wherein the nozzle generates an air stream directed at the sensor lens surface to remove debris from at least a portion of the sensor lens surface of the cylindrical sensor.

12. The sensor assembly of claim 11, wherein the extended member is rotatably coupled to the top surface of the cylindrical sensor body at the first end such that the nozzle moves in an arc around the sensor lens surface without contacting the sensor lens surface.

13. The sensor assembly of claim 11, wherein the extended member is rotatably coupled to the bottom surface of the cylindrical sensor body at the first end such that the nozzle moves in an arc around the sensor lens surface without contacting the sensor lens surface.

14. The sensor assembly of claim 11 wherein the controller generates an actuator control signal to control the actuator to rotate the extended member in an arc.

15. The sensor assembly of claim 11, wherein the vehicle sensor is a 360-degree LIDAR sensor and the sensor lens surface fully encircles the cylindrical sensor body.

16. The sensor assembly of claim 11, wherein the vehicle sensor is a 180-degree LIDAR sensor and the sensor lens surface encircles approximately half of the cylindrical sensor body.

17. The sensor assembly of claim 11, wherein the nozzle extends parallel to and along at least a portion of the sensor lens surface.

18. An automotive vehicle, comprising:
a vehicle body;
a cylindrical vehicle sensor coupled to the vehicle body, the cylindrical vehicle sensor having a top surface, a bottom surface opposite the top surface, and a sensor lens surface perpendicular to both of the top and bottom surfaces, the sensor lens surface extending around a periphery of the cylindrical vehicle sensor; and
a sensor lens cleaning system coupled to the cylindrical vehicle sensor, the sensor lens cleaning system configured to remove debris from at least a portion of the sensor lens surface of the cylindrical vehicle sensor, the sensor lens cleaning system comprising:
an extended member having a first end rotatably coupled to the cylindrical vehicle sensor and a second end opposite the first end;
a nozzle coupled to the second end of the extended member;
an actuator configured to control the extended member; and
a controller in electronic communication with the actuator and configured to communicate an actuator control signal to the actuator;
wherein the nozzle generates an air stream directed at the sensor lens surface.

19. The automotive vehicle of claim 18, wherein the cylindrical vehicle sensor is a 360-degree LIDAR sensor and the extended member is rotatably coupled to the top surface of the cylindrical sensor at the first end such that the nozzle moves in an arc around the sensor lens surface without contacting the sensor lens surface.

20. The automotive vehicle of claim 18, wherein the cylindrical vehicle sensor is a 360-degree LIDAR sensor and the extended member is rotatably coupled to the bottom surface of the cylindrical sensor at the first end such that the nozzle moves in an arc around the sensor lens surface without contacting the sensor lens surface.

* * * * *